United States Patent [19]
Iwai et al.

[11] Patent Number: 5,613,360
[45] Date of Patent: Mar. 25, 1997

[54] WARMING UP CONTROL DEVICE FOR A CATALYTIC CONVERTER FOR AN INTERNAL COMBUSTION ENGINE

[75] Inventors: Akira Iwai; Mamoru Yoshioka, both of Susono; Yasuhito Tsutsumi, Toyota, all of Japan

[73] Assignee: Toyota Jidosha Kabushiki Kaisha, Toyota, Japan

[21] Appl. No.: 385,436

[22] Filed: Feb. 8, 1995

[30] Foreign Application Priority Data

Feb. 18, 1994 [JP] Japan .................................. 6-021120

[51] Int. Cl.⁶ ...................................................... F01N 3/20
[52] U.S. Cl. ............................................. 60/284; 60/285
[58] Field of Search ........................... 60/284, 300, 285, 60/277

[56] References Cited

U.S. PATENT DOCUMENTS

| | | | |
|---|---|---|---|
| 4,656,829 | 4/1987 | Creps | 60/277 |
| 5,303,168 | 4/1994 | Cullen | 123/425 |

FOREIGN PATENT DOCUMENTS

| | | |
|---|---|---|
| 57-24427 | 2/1982 | Japan . |
| 63-26748 | 2/1988 | Japan . |
| 2-5740 | 1/1990 | Japan . |

*Primary Examiner*—Douglas Hart
*Attorney, Agent, or Firm*—Oliff & Berridge

[57] ABSTRACT

The warming up control device according to the present invention determines precisely whether the temperature of the catalytic converter of the internal combustion engine has reached the activating temperature of the catalyst after the engine starts, The device estimates the heat amount transferred from the exhaust gas the catalytic converter based on the amount of the fuel supplied to the engine, and calculates the total heat amount transferred to the catalytic converter after the engine starts. The device determines that the temperature of the catalytic converter reaches the activating temperature of the catalyst when the calculated total heat amount reaches a predetermined value. Since the completion of the warming up of the catalytic converter is precisely determined, the warming up operation of the catalyst, such as the ignition timing retardation, can be terminated at a proper time, thus an unnecessary increase in fuel consumption and a deterioration in the engine performance can be avoided.

8 Claims, 11 Drawing Sheets

A ··· CATALYTIC CONVERTER TEMPERATURE (HIGH AMBIENT TEMPERATURE)
B ··· COOLING WATER TEMPERATURE (HIGH AMBIENT TEMPERATURE)
A' ··· CATALYTIC CONVERTER TEMPERATURE (LOW AMBIENT TEMPERATURE)
B' ··· COOLING WATER TEMPERATURE (LOW AMBIENT TEMPERATURE)

WARMING UP CONTROL DEVICE FOR A CATALYTIC CONVERTER FOR AN INTERNAL COMBUSTION ENGINE

BACKGROUND OF THE INVENTION

1. Field of the Invention

The present invention relates to a warming up control device for a catalytic converter and, more specifically, such a control device capable of determining correctly whether the catalytic converter has been warmed up.

2. Description of the Related Art

An exhaust gas purification device that utilizes a three-way reducing and oxidizing catalytic converter disposed in the exhaust gas passage of an internal combustion engine is commonly used. Generally, the catalyst used in such converters is able to purify the pollutants such as HC, CO and $NO_x$ in the exhaust gas only when the temperature of the catalyst becomes higher than a certain temperature, i.e., the catalysts in the converter do not work when the temperature of the catalyst is lower than an activating temperature.

To shorten the time required for the catalyst to reach the activating temperature after the engine starts, a warming up operation, for the catalytic converter, is usually carried out when the engine is started in cold condition. This warming up operation of the catalytic converter comprises an operation for increasing the exhaust gas temperature to heat the catalytic converter by, for example, retarding an ignition timing of the engine.

However, it is preferable to terminate the warming up operation as soon as the catalytic converter has been warmed up, since the warming up operation by retarding the ignition timing worsens the fuel consumption of the engine and also causes deterioration of the engine performance such as engine output. To terminate the warming up operation at a proper time, it is required to determine accurately whether the catalytic converter has been warmed up, i.e., whether the temperature of the catalyst has reached the activating temperature. This can be achieved by measuring the temperature of the catalyst bed of the catalytic converter using a temperature sensor disposed in the catalyst bed. However, it is not practical to dispose a temperature sensor in the catalyst bed, since it increases the cost of the catalytic converter.

To avoid this problem, various warming up control devices have been proposed to determine the completion of the warming up of the catalytic converters without using the temperature sensors disposed in the catalyst beds.

For example, Japanese Unexamined Utility Model Publication (Kokai) No. 63-26748 proposes a warming up control device for the catalytic converter which determines that the catalytic converter has been warmed up when the accumulated amount of the inlet air to the engine, after the engine starts in cold conditions, reaches a predetermined value.

The temperature of the catalyst bed increases as the total amount of the exhaust gas flows through the catalytic converter increases. The warming up control device in JPP '748 calculates the accumulated amount of the intake air of the engine (i.e., the total amount of the exhaust gas that has flowed through the catalytic converter) after the engine starts in cold conditions, and determines that the temperature of the catalyst bed has reached the activating temperature of the catalyst when the accumulated amount of the intake air reaches a predetermined value. Namely, the warming up control device in JPP '748 determines the completion of the warming up of the catalytic converter without using a temperature sensor disposed in the catalyst bed.

However, the actual temperature of the catalyst bed is determined by the amount of the heat transferred from the exhaust gas to the catalyst bed, and the amount of the heat transferred to the catalyst bed depends on the temperature of the exhaust gas as well as the amount of the exhaust gas. Therefore, the temperature of the catalyst bed also changes in accordance with the exhaust gas temperature. Since the device in JPP '748 only determines the completion of the warming up of the catalytic converter based on the accumulated amount of the inlet air (the total amount of the exhaust gas), the temperature of the catalyst bed cannot be determined correctly. Therefore, it is difficult to terminate the warming up operation of the catalytic converter at a proper time.

SUMMARY OF THE INVENTION

In view of the above problems in the related art, the object of the present invention is to provide a warming up control device for a catalytic converter for an internal combustion engine which is capable of determining the completion of the warming up of the catalytic converter accurately without using temperature sensors for measuring the catalyst bed temperature.

The above object is achieved by a warming up control device for a catalytic converter according to the present invention in which the warming up control device includes a heat amount estimating means for calculating the amount of heat transferred from an exhaust gas to the catalytic converter.

The heat amount estimating means estimates the amount of heat based on an amount of the fuel fed to the engine and the ignition timing of the engine. The warming up control device also includes an total heat amount calculating means for calculating an accumulated value of the heat amount estimated by the heat amount estimating means and a determining means for determining that the catalytic converter has been warmed up when the accumulated value of the heat amount reaches a predetermined set value.

The amount of the heat generated in the combustion chamber is proportional to the amount of the fuel supplied to the engine. A part of the heat generated in the combustion chamber is converted into the mechanical work of the engine and the rest of the heat is discharged into the exhaust gas passage with the exhaust gas. The ratio of the heat discharged into the exhaust gas passage to the heat generated in the combustion chamber changes in accordance with the factors such as the ignition timing of the engine.

For example, when the ignition timing of the engine is retarded, the air-fuel mixture in the combustion chamber burns at later stage in the combustion cycle, and the amount of the heat leaving the combustion chamber with the exhaust gas increases, i.e., the temperature of the exhaust gas increases. Therefore, when the ignition timing of the engine is retarded, the amount of the heat transferred from the exhaust gas to the catalytic converter increases even when the amount of the fuel supplied to the engine is the same. This means that the warming up of the catalytic converter is affected by the ignition timing of the engine as well as the amount of the fuel supplied to the engine.

The warming up control device according to the present invention estimates the amount of the heat transferred from the exhaust gas to the catalytic converter based on the amount of the fuel supplied to the engine and the ignition timing of the engine, and calculates the total amount of the heat transferred to the catalytic converter after the engine starts. The total amount of the heat transferred to the catalytic converter has a direct relation to the temperature of the catalyst bed. Therefore, when the calculated total amount of the heat reaches a certain value, it can be considered that temperature of the catalyst bed has reached the activating temperature, i.e., the catalytic converter has been warmed up.

Since the amount of the heat transferred to the catalytic converter is estimated on the basis of the amount of the fuel supplied to the engine and the ignition timing of the engine, the temperature of the catalyst bed can be determined precisely and the completion of the warming up of the catalytic converter can be determined correctly.

BRIEF DESCRIPTION OF THE DRAWINGS

The present invention will be better understood from the description as set forth hereinafter, with reference to the accompanying drawings, in which.

DESCRIPTION OF THE PREFERRED EMBODIMENTS

Figure 1:
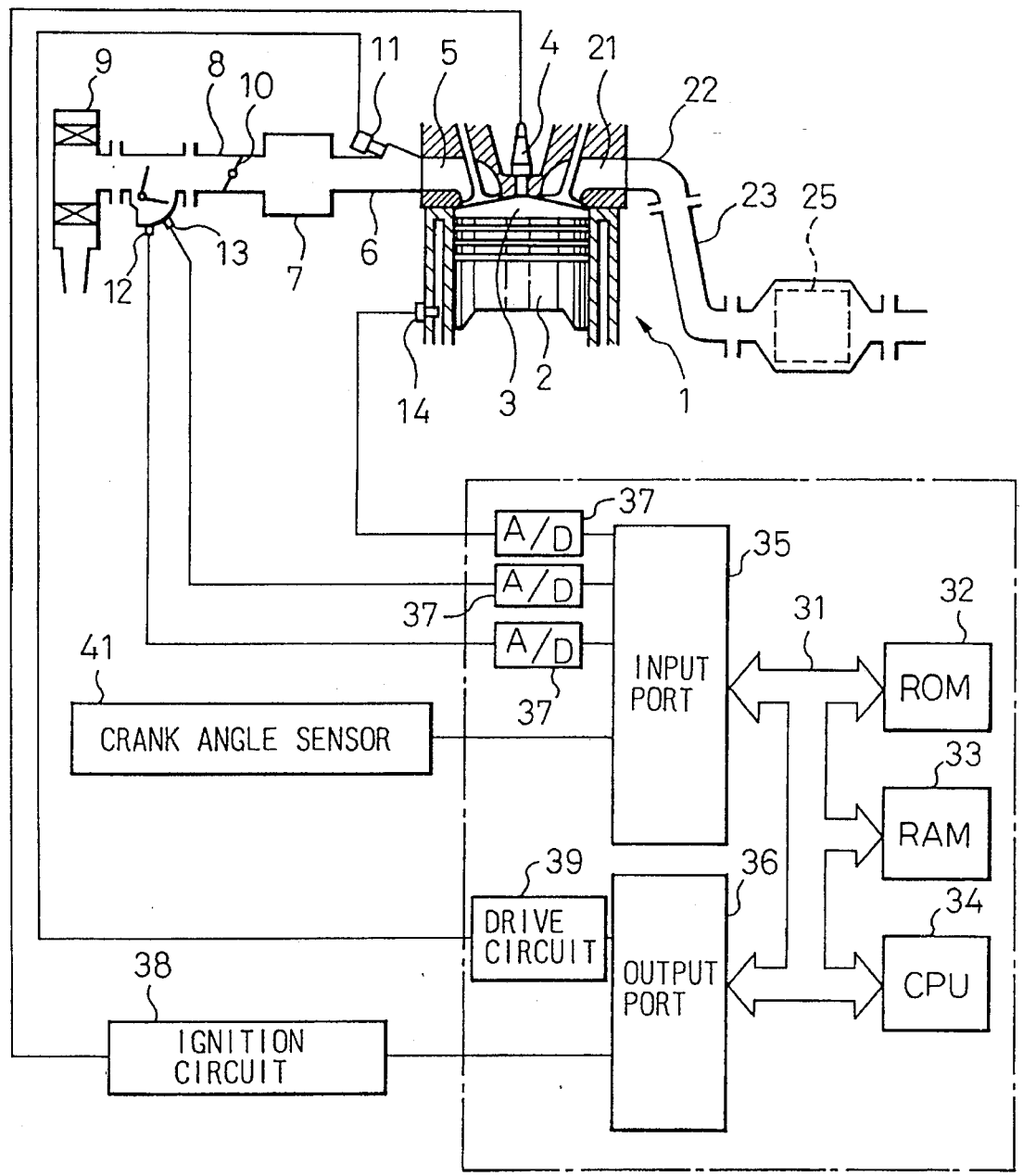
FIG. 1 is a schematic view of an internal combustion engine illustrating an embodiment of the present invention.

FIG. 1 schematically illustrates an embodiment of the warming up control device according to the present invention applied to an internal combustion engine for an automobile.

In FIG. 1, reference numeral 1 designates an internal combustion engine as a whole. Numerals 2, 3 and 4 represent a piston, a combustion chamber and a ignition plug of the respective cylinders of the engine 1. Numeral 6 designates an inlet manifold connecting an inlet port 5 of the respective cylinders to a surge tank 7. The surge tank 7 is connected to an air cleaner 9 by an inlet air passage 8.

An air-flow meter 12 is disposed in the inlet air passage 8. The air-flow meter 12 generates a voltage signal which is proportional to the amount of the air flowing through the inlet air passage 8. Numeral 10 represents a throttle valve disposed in the inlet air passage 8 between the air-flow meter 12 and the surge tank 7. The air-flow meter 12 is provided with an internal temperature sensor 13 which generates a voltage signal in accordance with the inlet air temperature. Also, a cooling water temperature sensor 14 which generates a voltage signal in accordance with the temperature of the engine cooling water, is disposed in the cooling water passage of the engine 1.

On the inlet manifold 6, a fuel injection valve 11 is provided near the inlet port 5 of each cylinder of the engine 1. The fuel injection valve supplies pressurized fuel from the fuel system to the cylinders of the engine in accordance with the fuel injection signal from the control circuit 30 explained below. An exhaust port 21 of each cylinder of the engine is connected to an exhaust gas passage 23 via an exhaust manifold 22. A catalytic converter 25 which contains a three-way reducing and oxidizing catalyst and is capable of removing pollutants such as HC, CO and $NO_x$ in the exhaust gas is disposed in the exhaust gas passage 23.

A crank angle sensor 41, which generates a pulse signal at every predetermined rotation angle of the crankshaft of the engine 1 is disposed on the ignition distributor (not shown) of the engine 1. The pulse signal from the crank angle sensor 41 is used for calculating the engine speed and also used as a reference signal to determine the ignition timing of the engine 1.

The control circuit 30, which may consist of a microcomputer, further comprises a read-only-memory (ROM) 32 for storing a main routine and interrupt routines such as a fuel injection routine, an ignition timing routine and constants, etc., a random-access-memory (RAM) 33 for storing temporary data, a central processing unit (CPU) 34, an input port 35, an output port 36, and a bi-directional bus 31 for connecting the CPU 34, the ROM 32, the RAM 33 and the input and output ports 35, 36 to each other. In this embodiment, the control circuit 30 also performs a warming up control of the catalytic converter as explained later.

The signal from the air-flow meter 12 which corresponds to the amount of the inlet air flow, and the signal from the temperature sensor 13 which corresponds to the temperature of the inlet air, are fed to the input port 35 of the control circuit 30 via converters 37. The inlet air temperature signal from the temperature sensor 13 is used for correcting the amount of the air flow in accordance with the air temperature, and, as explained later, to estimate the temperature of the catalytic converter 25 when the engine 1 starts.

Further, the signal from the cooling water temperature sensor 14, which corresponds to the temperature of the cooling water of the engine 1, is fed to the input port 35 via the AD converter 37. An output signal of the crank angle sensor 41 is fed directly to the input port 35 of the control circuit 30.

The output port 36 of the control circuit 30 is connected to the fuel injection valve 11 through a drive circuit 39, and to the ignition plug 4 through an ignition circuit 38.

The control circuit 30 calculates the amount of the fuel injection based on the amount of the inlet air flow and the engine speed, and actuates the fuel injection valve 11 to supply the calculated amount of the fuel to the engine.

Further, the control circuit 30 calculates the ignition timing of the engine 1 based on the engine load and the engine speed. The control circuit 30 monitors the rotation angle of the crankshaft based on the reference signal from the crank angle sensor 41, and outputs an ignition signal to the ignition circuit 38 when the crank angle reaches a value required to obtain the calculated ignition timing.

Next, embodiments of the warming up control of the catalytic converter of the present invention are explained with reference to FIGS. 2 through 13.

Figure 2:
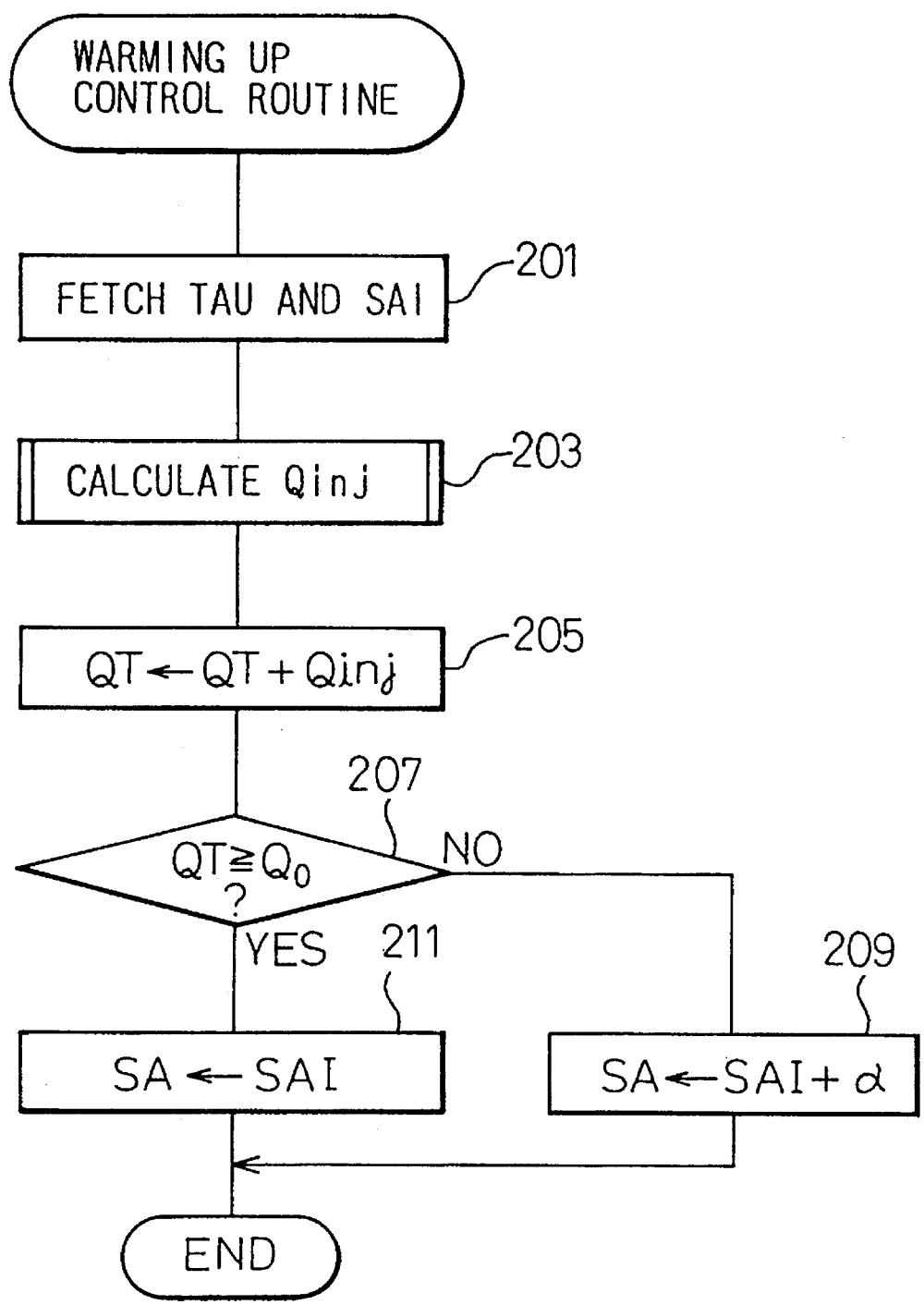
FIG. 2 is a flowchart showing an embodiment of the warming up control operation according to the present invention.

FIG. 2 shows a flowchart of an embodiment of the warming up control of the present invention. This routine is processed by the control circuit 30 at every 360° rotation of the crankshaft (or alternatively this routine may be processed at every fuel injection timing).

In this routine, the control circuit calculates the amount of the heat transferred from the exhaust gas to the catalytic converter per one revolution of the engine based on the fuel injection amount TAU, and calculates the total amount of the heat transferred from the exhaust gas to the catalytic converter since the engine started by accumulating the heat transferred to the catalytic converter per one revolution of the engine. When the total amount of the heat transferred to the catalytic converter is smaller than a predetermined value, the control circuit 30 performs a warming up operation of the catalytic converter, i.e., the control circuit 30 increases the exhaust gas temperature by retarding the ignition timing of the engine by a predetermined amount. When the total (accumulated) amount of the heat transferred to the catalytic converter reaches the predetermined value, since it is considered that the catalytic converter has been warmed up, the control circuit 30 stops the warming up operation by advancing the ignition timing to a normal value.

When the routine starts, at step 201 in FIG. 2, the fuel injection amount TAU and a normal ignition timing SAI are fetched from the RAM 33. The fuel injection amount TAU and the normal ignition timing SAI are calculated at predetermined intervals by routines (not shown) separately processed by the control circuit 30 based on the engine load (such as the amount of inlet air flow per one revolution of the engine) and the engine speed, and is stored in predetermined regions of the RAM 33.

Then, at step 203, the amount of the heat $Q_{inj}$ which is transferred from the exhaust gas to the catalytic converter is calculated. The calculation method of $Q_{inj}$ will be explained later in detail.

After calculating $Q_{inj}$ at step 203, the routine proceeds to step 205 which calculates the accumulated value QT of the heat amount $Q_{inj}$. When the engine starts, the value of QT is set to be an initial value of 0, therefore the accumulated value QT represents the total amount of the heat transferred from the exhaust gas to the catalytic converter after the engine starts. Then, at step 207, it is determined whether the catalytic converter has been warmed up by comparing the total heat amount QT calculated at step 205 with a predetermined value $Q_0$. The value $Q_0$ represents a total heat amount required for warming up the catalytic converter, and varies in accordance with types of the engines and the sizes of the catalytic converters and the exhaust gas passages. The actual value of $Q_0$ is previously determined by experiment, for example, and is stored in the ROM 32 of the control circuit 30 in the form of a map using the value of the actual ignition timing.

If $QT < Q_0$ at step 207, since it is considered that the catalytic converter is not sufficiently warmed up, the routine proceeds to step 209 which retards the ignition timing SA from the normal ignition timing SAI by a predetermined amount α, i.e., to warm up the catalytic converter.

On the other hand, if $QT \geq Q_0$ at step 207, it is considered that the catalytic converter has received sufficient amount of the heat from the exhaust gas and has been warmed up. Therefore, the routine proceeds to step 211 which sets the actual ignition timing SA to the normal ignition timing SAI, i.e., terminates the warming up operation of the catalytic converter.

When the actual ignition timing SA is set by the routine in FIG. 2, the control circuit 30 transmits a control signal to the ignition circuit 38 to generate a spark at the ignition plug 4 at the ignition timing SA set by the above routine.

By the routine in FIG. 2, warming up operation of the catalytic converter by the ignition timing retarding is performed until the catalytic converter has been warmed up sufficiently, and the warming up operation is terminated as soon as it is determined that the catalytic converter has been warmed up. Therefore, the catalytic converter is warmed up in short time. Further, the increase in the fuel consumption and the deterioration of the engine performance can be kept to a minimum since the warming up operation is terminated immediately after the catalytic converter has been warmed up.

Figure 3:
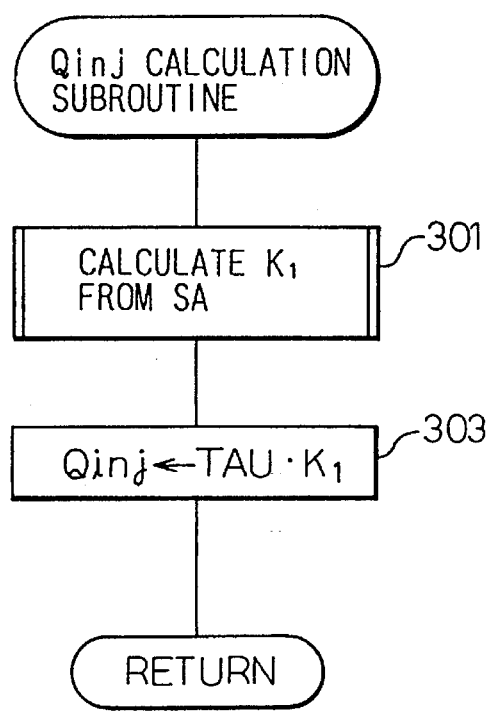
FIG. 3 is a flowchart illustrating an example of the subroutine for calculating the heat amount transferred to the catalytic converter from the exhaust gas.

The calculation of the heat transferred to the catalytic converter at step 203 in FIG. 2 will now be explained. FIG. 3 is a flowchart illustrating an example of the subroutine executed at step 203 in FIG. 2 to calculate the amount of the heat Qinj transferred to the catalytic converter.

In the subroutine of FIG. 3, the amount of the heat $Q_{inj}$ transferred to the catalytic converter is calculated in accordance with the fuel injection amount TAU and the actual ignition timing SA. As explained before, the fuel amount TAU is directly proportional to the amount of the heat generated in the combustion chamber per one engine rotation, and the actual ignition timing SA determines the ratio of the amount of the heat which is carried by the exhaust gas leaving the combustion chamber to the amount of the heat generated in the combustion chamber. The amount of heat Qinj transferred to the catalytic converter from the exhaust gas is proportional to the amount of the heat carried by the exhaust gas leaving the combustion chamber. Therefore, the amount of the heat $Q_{inj}$ transferred to the catalytic converter can be calculated from the fuel injection amount TAU and the actual ignition timing SA.

In this embodiment, the amount of the heat $Q_{inj}$ transferred to the catalytic converter per one revolution of the engine is calculated by Qinj=TAU×$K_1$, where $K_1$ is a coefficient including the conversion factor between the fuel injection amount TAU and the amount of the heat generated in the combustion chamber, and the ratio of the amount of the heat transferred to the catalytic converter to the amount of the heat generated in the combustion chamber. The coefficient $K_1$ is previously determined by experiment, for example, and is stored in the ROM 32 of the control circuit 30.

Figure 4:
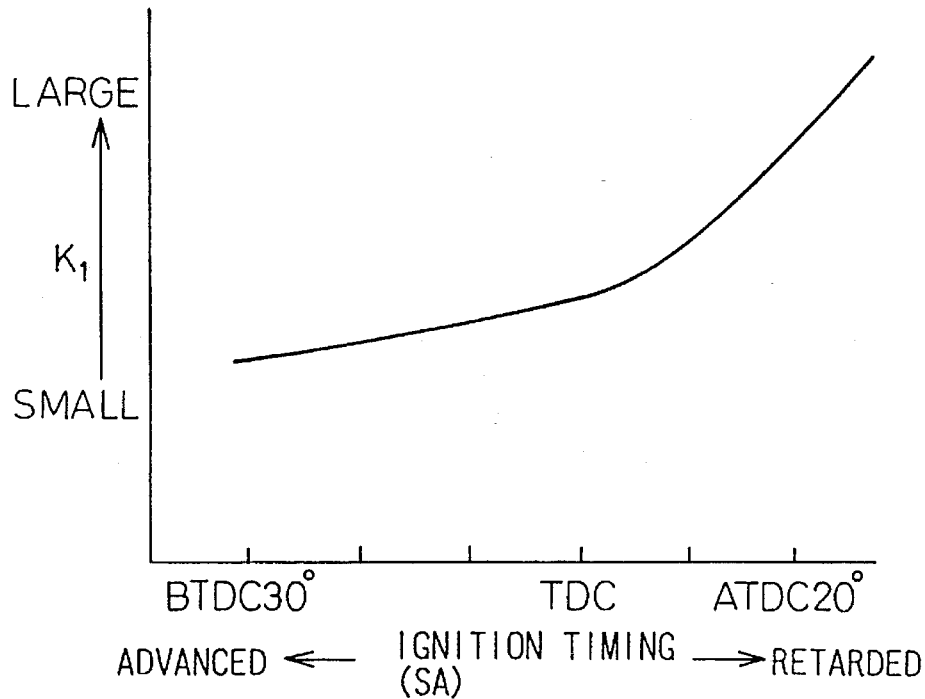
FIG. 4 shows a map used in the subroutine in FIG. 3.

FIG. 4 shows an example of the relationship between the actual ignition timing SA and the value of $K_1$. As seen from FIG. 4, the value of $K_1$ increases as the ignition timing is retarded. In the subroutine of FIG. 3, the amount of the heat $Q_{inj}$ transferred to the catalytic converter is calculated based on the value of $K_1$ shown in FIG. 4. Namely, in FIG. 3, at step 301, the coefficient $K_1$ is determined from the relationship in FIG. 4 based on the actual ignition timing SA which is determined by the routine in FIG. 2, and at step 303, the amount of the heat $Q_{inj}$ is calculated by the fuel injection amount TAU and the coefficient $K_1$.

Since the normal (optimum) ignition timing SAI changes in accordance with the engine load condition, the value of the actual ignition timing SA is also changed in accordance with the engine load condition by step 209 in FIG. 2. Therefore, the amount of the heat transferred to the catalytic converter varies in accordance with the engine load even if the fuel injection amount $Q_{inj}$ is maintained at same value. In this embodiment, since the amount of the heat $Q_{inj}$ transferred to the catalytic converter is calculated in accordance with the actual ignition timing SA, the amount of the heat $Q_{inj}$ can be estimated correctly even if the engine load changes during the warming up operation of the catalytic converter.

Though the fuel injection amount TAU is used for calculating the amount of the heat generated in the combustion chamber, other operating parameters of the engine having a correlation with the fuel injection amount can be used instead of TAU. For example, the amount of the inlet air flow per one revolution of the engine, or the inlet air pressure in the inlet manifold 6 can be used to calculate the amount of the heat generated in the combustion chamber.

Next, another embodiment of the calculation of the amount of the heat $Q_{inj}$, in which the subroutine in FIG. 3 is modified, is explained with reference to FIG. 5.

In this embodiment, the amount of the heat $Q_{inj}$ calculated by the subroutine in FIG. 3 is further corrected in accordance with the engine speed N. When the engine speed N becomes high, the amount of the heat transferred from the exhaust gas to the wall of the combustion chamber and the exhaust gas passage becomes relatively small. Therefore, even though the fuel injection amount TAU and the actual ignition timing SA are both maintained the same, the amount of the heat $Q_{inj}$ transferred to the catalytic converter from the exhaust gas becomes larger as the engine speed increases. In this embodiment, the amount of the heat $Q_{inj}$ transferred to the catalytic converter is corrected by a factor $K_2$ determined in accordance with the engine speed N. Namely, the amount of the heat $Q_{inj}$ is calculated by, $Q_{inj}=TAU \times K_1 \times K_2$ in this embodiment.

Figure 6:
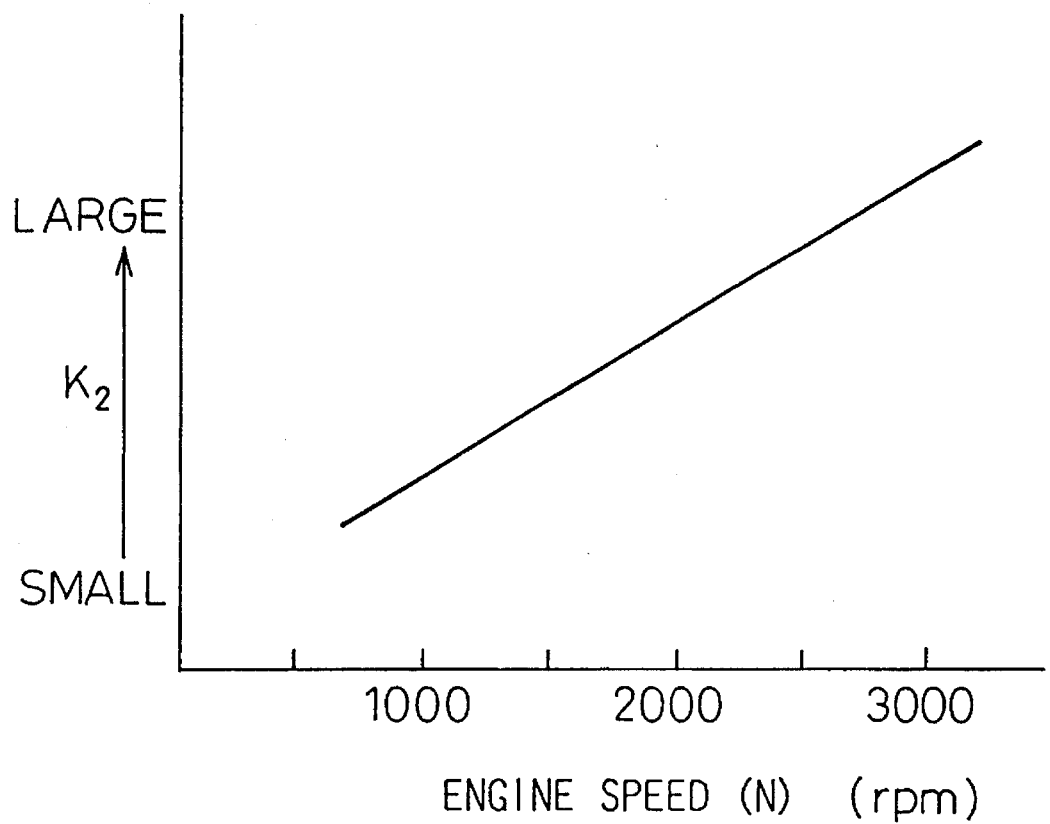
FIG. 6 shows a map used in the subroutine in FIG. 5.

FIG. 6 shows an example of the relationship between the engine speed N and the value of $K_2$. As seen from FIG. 6, the value of $K_2$ increases almost linearly as the engine speed N increases. The actual value of the coefficient $K_2$ is previously determined by experiment, for example, and is stored in the ROM 32 of the control circuit 30 in the form of a map using the engine speed N.

Figure 5:
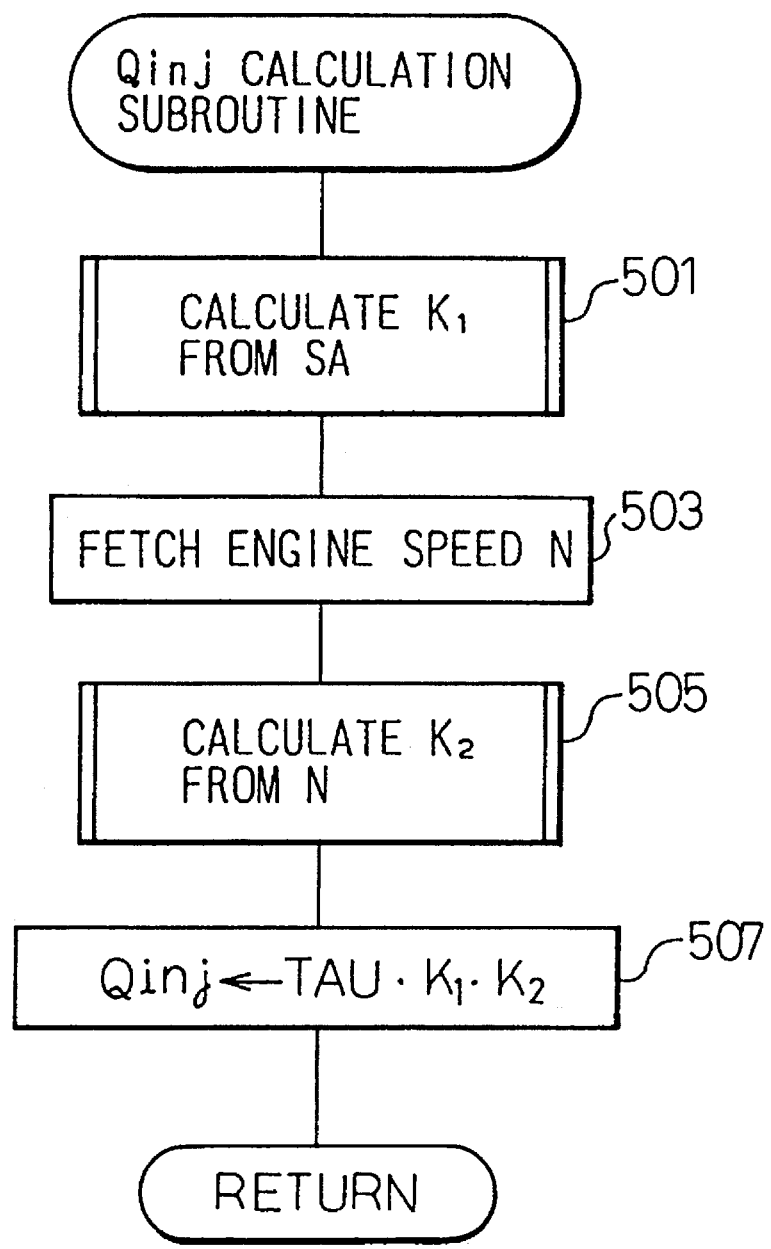
FIG. 5 is a flowchart illustrating another example of the subroutine for calculating the heat amount transferred to the catalytic converter from the exhaust gas.

In the subroutine of FIG. 5, at step 501, the value of the coefficient $K_1$ is determined from the map of FIG. 4 in the same manner as step 301 in FIG. 3. Then, at step 503, the engine speed N is fetched from the RAM 33 of the control circuit 30, and the coefficient K2 is determined from the map of FIG. 6 using the engine speed N. The engine speed N is calculated in accordance with the pulse signals from the crank angle sensor 41 by a separate routine (not shown) processed by the control circuit 30 at regular intervals, and stored in the RAM 33.

Then, at step 507, the amount of the heat $Q_{inj}$ is calculated by, $Q_{inj}=TAU \times K_1 \times K_2$, using the values of the coefficients $K_1$ and $K_2$ determined at steps 501 and 505.

In this embodiment, the amount of the heat $Q_{inj}$ transferred to the catalytic converter can be estimated accurately even if the engine speed N changes during the warming up operation of the catalytic converter.

Next, another embodiment of the calculation of the amount of the heat $Q_{inj}$, in which the subroutine in FIG. 5 is further modified. In this embodiment, the amount of the heat $Q_{inj}$ is further corrected in accordance with an air-fuel ratio of the engine. For example, when the engine starts, the fuel supplied to the engine is increased to make the air-fuel ratio of the air-fuel mixture in the combustion chamber lower than the stoichiometric air-fuel ratio (i.e., the air-fuel ratio of the engine becomes rich). In a rich air-fuel ratio operation of the engine, the exhaust gas temperature becomes higher as the air-fuel ratio of the engine becomes higher (i.e., as the air-fuel ratio of the engine approaches the stoichiometric air-fuel ratio). Therefore, the amount of the heat $Q_{inj}$ transferred to the catalytic converter increases as the air-fuel ratio of the engine becomes higher after the engine starts.

In this embodiment, a coefficient $K_3$ is determined in accordance with the air-fuel ratio of the engine, and the amount of the heat $Q_{inj}$ is calculated by, $Q_{inj}=TAU \times K_1 \times K_2 \times K_3$.

Figure 8:
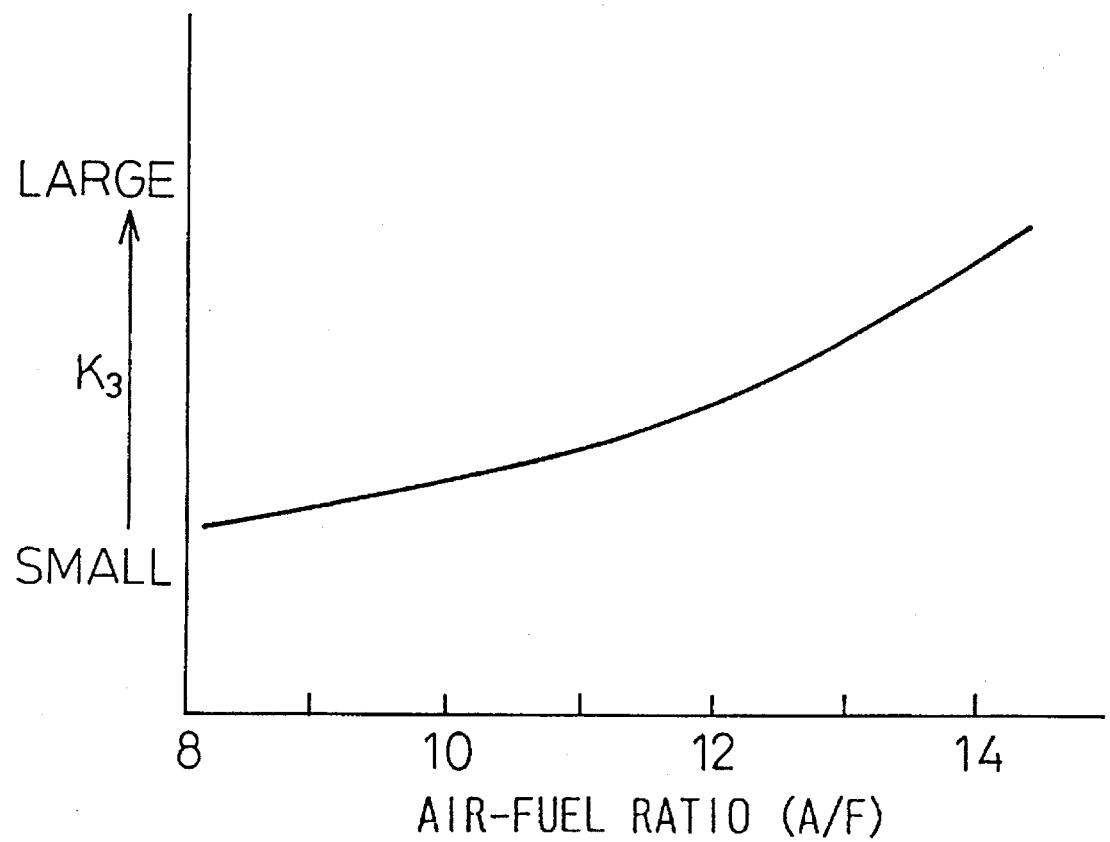
FIG. 8 shows a map used in the subroutine in FIG. 7.

The coefficients $K_1$ and $K_2$ are the same as those in FIG. 5. Namely, the amount of the heat $Q_{inj}$ calculated by the subroutine in FIG. 5 is further corrected by the factor $K_3$. The actual value of the coefficient $K_3$ is previously determined by experiment, and stored in the ROM 32 of the control circuit 30 in the form of a map using the air-fuel ratio of the engine. FIG. 8 shows an example of the relationship between the value of the coefficient $K_3$ and the air-fuel ratio of the engine. As seen from FIG. 8, the value of $K_3$ increases as the air-fuel ratio of the engine A/F increases.

Figure 7:
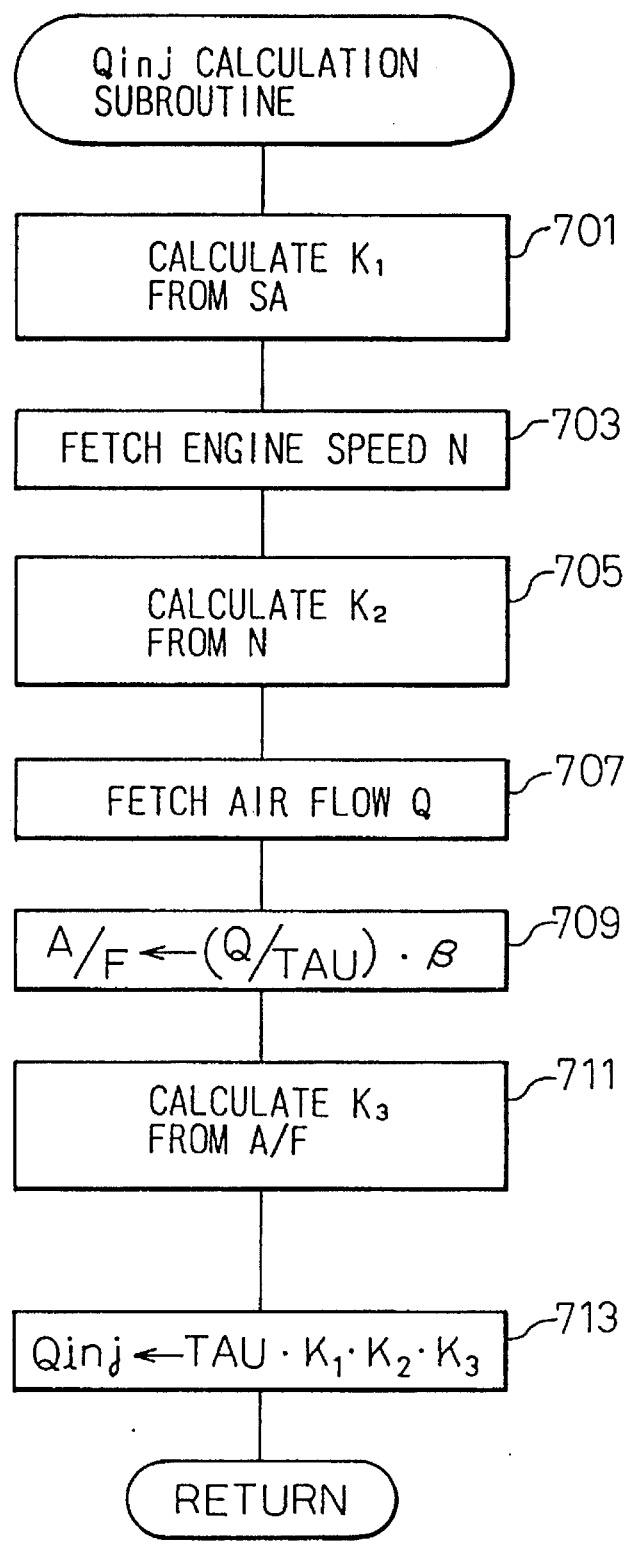
FIG. 7 is a flowchart illustrating another example of the subroutine for calculating the heat amount transferred to the catalytic converter from the exhaust gas.

FIG. 7 is a flowchart illustrating an example of the subroutine for calculating the amount of the heat $Q_{inj}$. In FIG. 7, at steps 701 through 705, the coefficients $K_1$ and $K_2$ are determined in the same manner as in the subroutines in FIGS. 3 and 5. Then, at step 707, the amount of the inlet air flow Q is fetched from the RAM 33. The amount of the inlet air flow Q is calculated in accordance with the output signals of the air-flow meter 12 and the inlet air temperature sensor 13 by a routine (not shown) processed by the control circuit 30 at regular intervals, and stored in RAM 33.

At step 709, the air-fuel ratio A/F of the engine is calculated based on the fuel injection amount TAU and the amount of the inlet air flow Q by $A/F=(Q/TAU) \times \beta$ where $\beta$ is a constant. At step 711, the coefficient $K_3$ is determined from the map in FIG. 8 based on the air-fuel ratio A/F of the engine, and at step 713, the amount of the heat transferred to the catalytic converter is calculated by $Q_{inj}=TAU \times K_1 \times K_2 \times K_3$.

As explained above, the amount of the heat $Q_{inj}$ is calculated based on the air-fuel ratio of the engine as well as the ignition timing SA and the engine speed N. Therefore, the amount of the heat $Q_{inj}$ can be precisely estimated even if the air-fuel ratio of the engine varies due to the change in the operating condition of the engine during the warming up operation.

Though the amount of the heat $Q_{inj}$ is corrected by engine speed N as well as the air-fuel ratio A/F of the engine, the amount of the heat $Q_{inj}$ can be calculated approximately by $Q_{inj}=TAU \times K_1 \times K_3$ without correcting for the engine speed N.

As explained before, when the amount of the heat $Q_{inj}$ is calculated by any one of the subroutines in FIGS. 3, 5, and 7, the accumulated value (the total amount) QT of $Q_{inj}$ after the engine starts is calculated by the routine in FIG. 2, and it is determined that the catalytic converter has been warmed up when the total amount of the heat QT reaches the predetermined value $Q_0$. The value $Q_0$ may be a constant, however it is preferable to determine the value $Q_0$ in accordance with the temperature of the catalytic converter when the engine starts. In the embodiment explained below, the value $Q_0$, i.e., a required total amount of the heat to warm up the catalytic converter is determined based on the temperature of the catalytic converter when the engine starts (an initial temperature of the catalytic converter).

Figure 9:
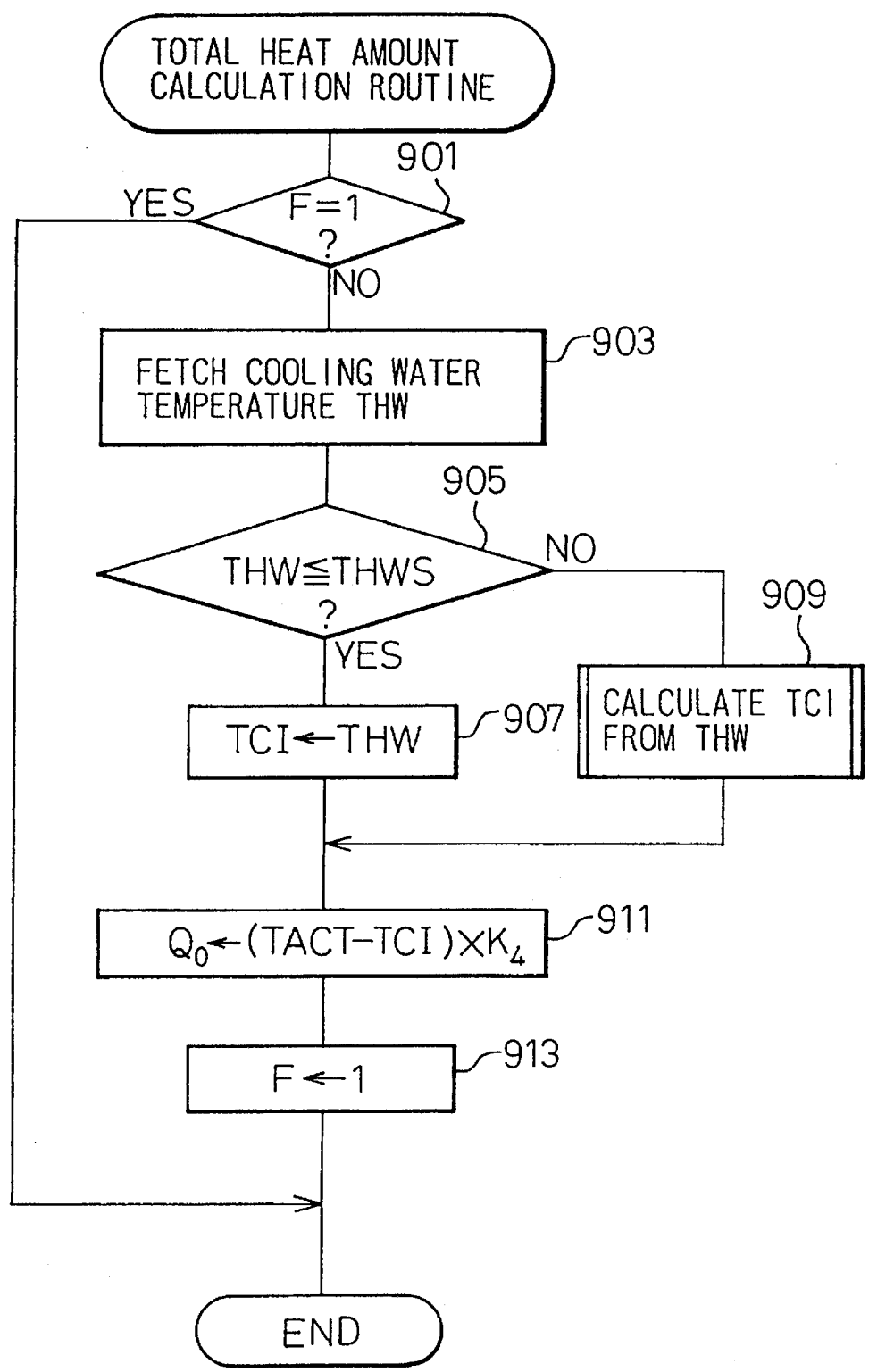
FIG. 9 is a flowchart illustrating an embodiment of the determination of the total heat amount $Q_0$ required for warming up the catalytic converter, based on the initial temperature of the catalytic converter.

FIG. 9 is a flowchart illustrating an embodiment of the determination of the total amount of the heat $Q_0$ required for warming up the catalytic converter based on the initial temperature of the catalytic converter. In FIG. 9, TCI represents the initial temperature, i.e., the temperature of the catalytic converter when the engine starts. The routine in FIG. 9 is processed by the control circuit 30 only once when the engine starts, to estimate the initial temperature TCI based on the cooling water temperature of the engine.

In FIG. 9, at step 901, it is determined whether a value of a flag F is 1. The value of the flag F is set to be an initial value of 0 when the engine starts, and set to be 1 at step 915, after the value of $Q_0$ is determined at step 913. If the value of the flag F is 1 at step 901, the routine terminates immediately without processing steps 903 through 913. Steps 903 through 913 are executed only when the value of the flag F is 0, i.e., the determination of the value of $Q_0$ (steps 903 through 913) is executed only once after the engine starts.

At step 903, the temperature THW of the engine cooling water is fetched from the RAM 33. The cooling water temperature THW is read from the cooling water temperature sensor 14 at a regular intervals, and the AD converted value thereof is stored in the RAM 33. Since step 903 is processed only immediately after the engine starts, the temperature read at step 903 is the temperature of the engine cooling water when the engine starts.

Then, at step 905, the value of the cooling water temperature THW read at step 903 is compared with a predetermined value THWS. In this embodiment, the value THWS is set, for example, between 30° and 40° C. When the value of the cooling water temperature THW is smaller than or equal to THWS, it can be considered that long time has lapsed since the engine was stopped last, and that both the engine cooling water temperature and the temperature of the catalytic converter become nearly equal to the ambient temperature.

Therefore, in this case, the routine proceeds to step 907 which set the initial temperature TCI of the catalytic converter to be the same value as the cooling water temperature THW read at step 903.

On the other hand, when the engine cooling water temperature THW is higher than the value THWS, it is considered that the engine is restarted after relatively short period since the engine stopped last, and a difference exist between the cooling water temperature and the catalytic converter temperature. Therefore, the routine proceeds to step 909 in this case, to estimate the initial temperature TCI of the catalytic converter based on a relationship between the initial temperature TCI and the cooling water temperature THW.

Figure 10:
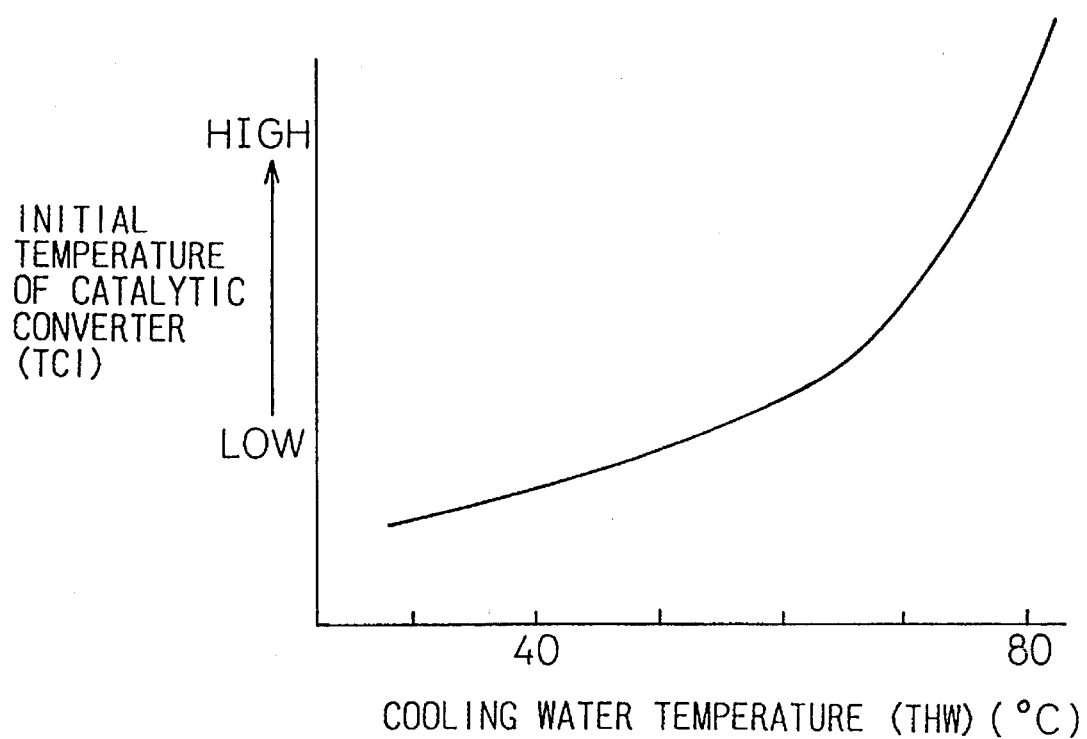
FIG. 10 shows a map used in the routine in FIG. 9 to determine the initial temperature of the catalytic converter.

FIG. 10 illustrates an example of the relationship between the cooling water temperature THW after engine stops and the initial temperature TCI of the catalytic converter. This relationship between THW and TCI varies in accordance with the arrangement of the exhaust gas passage of the engine and the location of the catalytic converter. Therefore, the actual relationship of FIG. 10 is previously determined by experiment and is stored in the ROM 32 as a map based on the cooling water temperature THW.

At step 911, the total heat amount $Q_0$ required for warming up the catalytic converter is calculated by $$Q_0 = (TACT - TCI) \times K_4$$

where TACT is the activating temperature of the catalyst (for example, about 350° C.), and $K_4$ is a constant determined in accordance with the specific heat of the catalyst bed and the coefficient of heat transfer between the catalyst bed and the exhaust gas. The actual value of $K_4$ is determined by experiment, for example. The value of $Q_0$, thus represents the total heat amount required for raising the temperature of the catalyst bed to the activating temperature of the catalyst, i.e., the total heat amount required for warming up the catalytic converter.

Then, the routine terminates after setting the value of the flag F to be 1 at step 913.

According to the embodiment in FIG. 9, the total heat amount $Q_0$ required for warming up the catalytic converter is determined in accordance with the initial temperature of the catalytic converter. Therefore, the completion of the warming up of the catalytic converter can be determined accurately even if the initial temperature of the catalytic converter changes.

Next, another embodiment for determining the total heat amount $Q_0$ is explained. In this embodiment, the total heat amount $Q_0$ is also determined in accordance with the initial temperature TCI of the catalytic converter, however, the initial temperature TCI is estimated more accurately.

In this embodiment, the initial temperature TCI is estimated based on the engine cooling water temperature THW. However, the catalytic converter temperature after engine stops is largely affected by the ambient air temperature, since the catalytic converter is directly exposed to the ambient air. Therefore, when the ambient air temperature is different, the rate of decrease of the catalytic converter temperature after the engine stops (i.e., cooling rate of the catalytic converter) becomes different. In the embodiment explained below, the difference in the cooling rate of the catalytic converter is taken into consideration when the initial temperature of the catalytic converter is determined.

Figure 12:
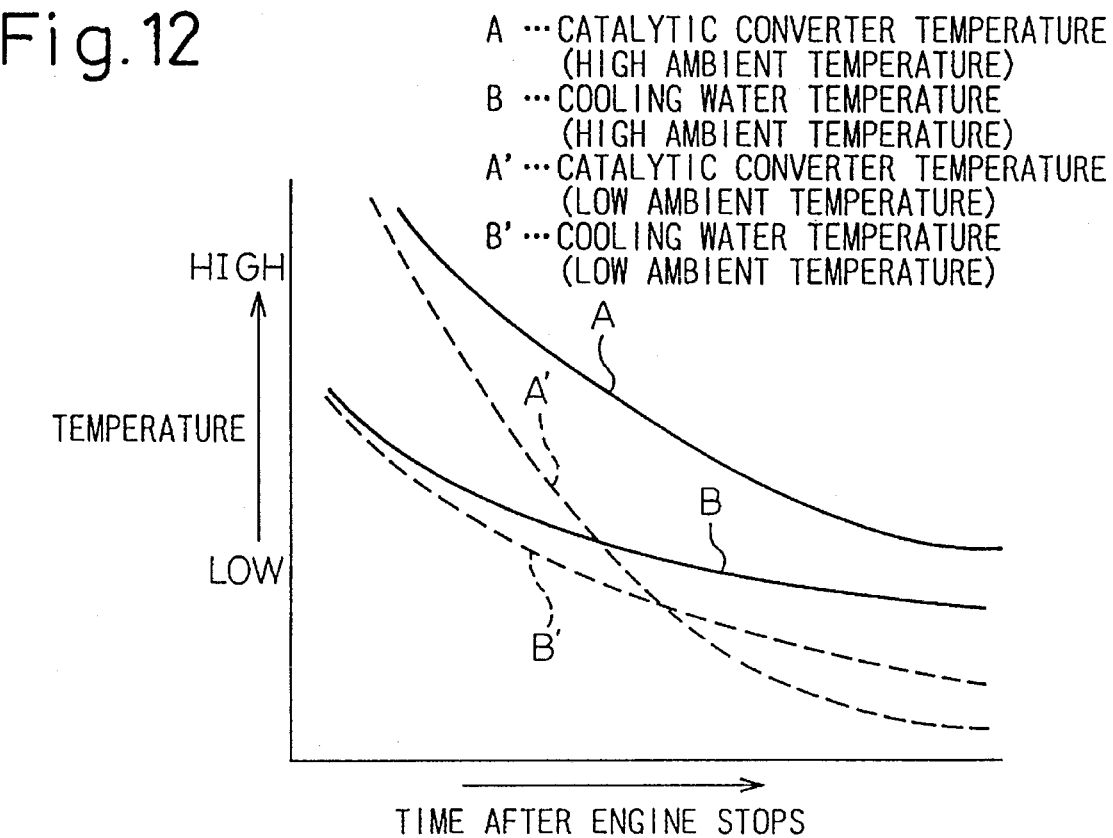
FIG. 12 is a graph showing the effect of the ambient temperature on the falling rate of the temperature of the catalytic converter; and, FIG. 13 shows a map used in the routine in FIG. 11.

FIG. 12 illustrates the effect of the ambient temperature on the cooling rate of the catalytic converter (curves A and A') and on the cooling rate of the engine cooling water (curves B and B'). In FIG. 12, the vertical axis represents a temperature and horizontal axis represents a time lapsed after the engine stops. The curves A and A' show the change in the temperature of the catalytic converter when the ambient temperature is high (curve A) and low (curve A'), respectively. Similarly, the curves B and B' show the change in the temperature of the engine cooling water when the ambient temperature is high (curve B) and low (curve B'), respectively.

As seen from FIG. 12, though there is no significant difference between the falling rates of the cooling water temperature after the engine stops when the ambient temperature is high (curve B) and low (curve B'), the falling rate of the catalytic converter temperature is much larger when the ambient temperature is low (curve A') than when the ambient temperature is high (curve A). Therefore, the relationship between the temperatures of the engine cooling water and the catalytic converter after the engine stops changes in accordance with the ambient temperature.

Figure 13:
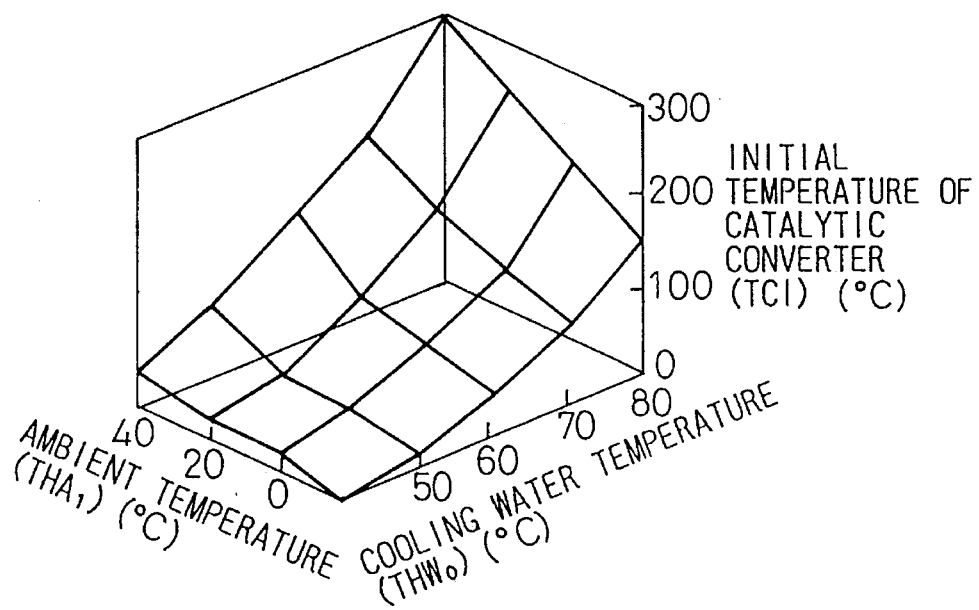

In this embodiment, the relationships between the temperatures of the engine cooling water and the catalytic converter are actually measured at respective ambient temperature, and stored in the ROM 32 of the control circuit 30 in a form of a map as shown in FIG. 13 using the ambient temperature $THA_1$ and the engine cooling water temperature $THW_0$ as parameters. The initial temperature TCI of the catalytic converter is determined based on this map.

Figure 11:
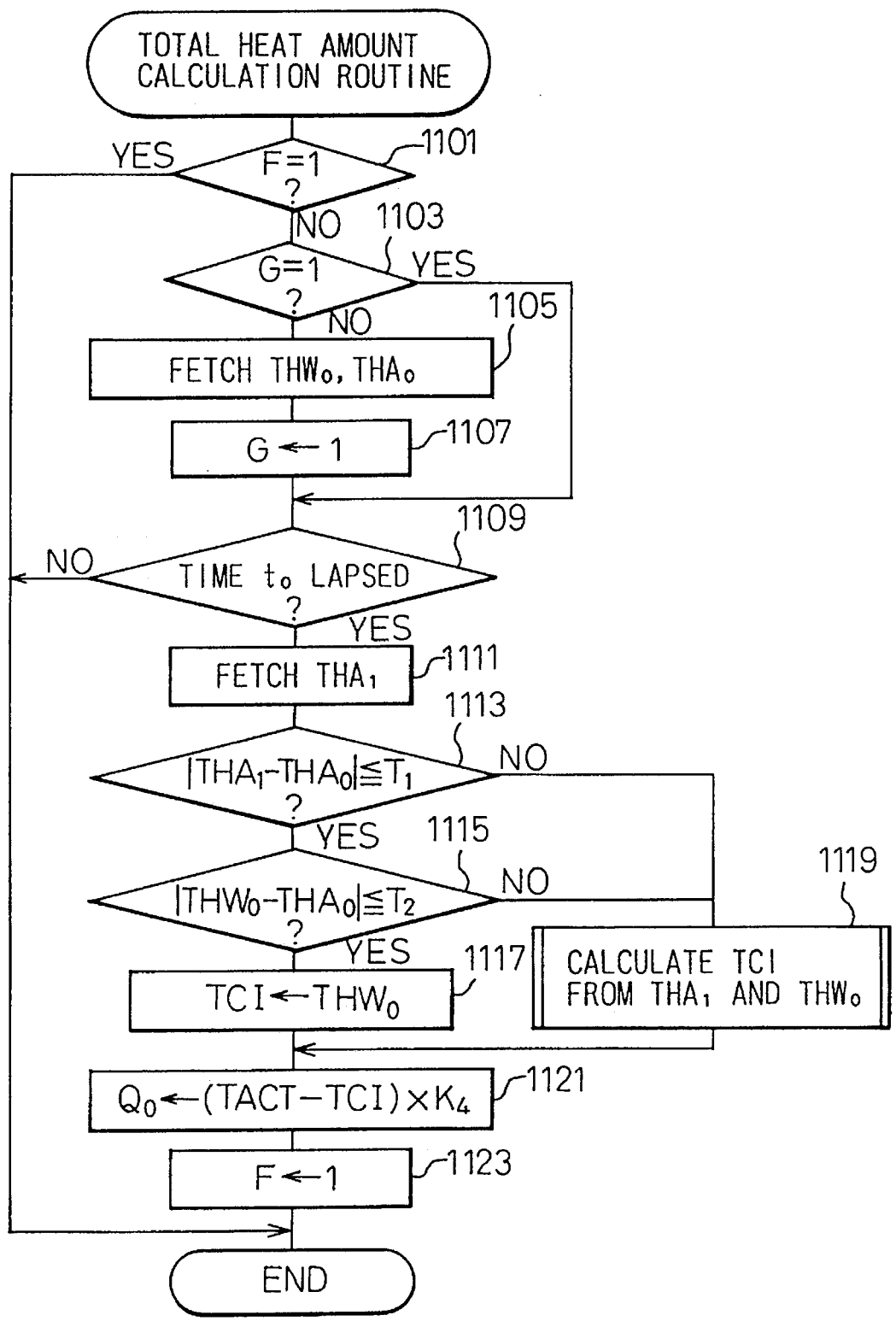
FIG. 11 is a flowchart illustrating another embodiment of the determination of the total heat amount $Q_0$ required for warming up the catalytic converter.

FIG. 11 is a flowchart illustrating the estimation of the initial temperature TCI of the catalytic converter based on the ambient temperature $THA_1$ and the engine cooling water temperature $THW_0$. The routine in FIG. 11 is processed by the control circuit 30 at predetermined intervals.

In FIG. 11, when the routine starts, it is determined whether the value of the flag F is equal to 1 at step 1101. The function of the flag F is the same as that of FIG. 9. At step 1103, it is determined whether the value of another flag G is equal to 1. If the value of the flag G is not 1 at step 1103, the routine proceeds to step 1105 which fetches the present value of the engine cooling water temperature and the engine inlet air temperature from the RAM 33, and stores the value of these temperatures in the RAM 33 as $THW_0$ and $THA_0$. Then, at step 1107, the value of the flag G is set to be 1. If the value of the flag G is 1 at step 1103, the routine proceeds to step 1109 without executing steps 1105 and 1107. The flag G is set to be 0 at every start of the engine, thus, step 1105 is executed only once when the engine starts. Thus, $THW_0$ and $THA_0$ represent the engine cooling water temperature and the inlet air temperature immediately after the engine starts. The inlet air temperature is read from the inlet air temperature sensor 13 built in the air-flow meter 12 at regular intervals and the AD converted value thereof is stored in a predetermined region of the RAM 33.

Then, at step 1109, it is determined whether a predetermined time $t_0$ has lapsed since the engine started, and if the time $t_0$ has not lapsed, the routine terminates immediately. On the other hand, if the time $t_0$ has lapsed at step 1109, the inlet air temperature is fetched from the ram 33 again, and the value thereof is stored as $THA_1$ in the RAM 33 at step 1111. Thus, by executing steps 1105 and 1111, the inlet air temperatures when the engine starts and when a predetermined time lapsed after the engine starts are stored in RAM 33 as $THA_0$ and $THA_1$.

Then the routine proceeds to steps 1113 and 1115, which determines whether the engine was started in the cold condition. At step 1113, the absolute value of the difference between the inlet air temperatures $THA_1$ and $THA_0$ (i.e., $|THA_1-THA_0|$) is compared with a predetermined value $T_1$, and at step 1115, the absolute value of the difference between the engine cooling water temperature $THW_0$ and the inlet air temperature $THA_0$ (i.e., $|THW_0-THA_0|$) is compared with a predetermined value $T_2$, respectively.

After the engine stops, the air held in the inlet air passage near the inlet air temperature sensor 13 is heated by the hot wall of the inlet air passage. Therefore, the temperature sensed by the inlet air temperature sensor 13 becomes higher than the ambient temperature unless the engine is completely cooled down. On the other hand, once the engine starts, fresh ambient air is introduced into the inlet air passage continuously, and when a certain time (such as $t_0$) lapsed after the engine starts, the temperature sensed by the inlet air temperature sensor 13 becomes the same as the ambient temperature. Therefore, if the difference $|THA_1-THA_0|$ is small, it can be considered that the engine is completely cooled down before restarts, i.e., the engine was started in the cold condition.

Further, when the engine is completely cooled down, the temperature of the air held in the inlet air passage and the temperature of the engine cooling water temperature become nearly the same. Therefore, it can be considered that the engine was started in the cold condition when the difference between the temperature of the inlet air $THA_0$ sensed by the inlet air temperature sensor 13 at the engine starts and the temperature of the engine cooling water $THW_0$ is small. Therefore, in this embodiment, it is determined that the engine was started in the cold condition when $|THA_1-THA_0|\leq T_1$ at step 1113 and $|THW_0-THA_0|\leq T_2$ at step 1115 are both satisfied.

If the both conditions of steps 1113 and 1115 are satisfied, i.e., if the engine started in the cold condition, the routine proceeds to step 1117 which estimate the initial temperature TCI of the catalytic converter the same as the cooling water temperature $THW_0$, since the engine was completely cooled down before starting and it is considered that the temperature of the catalytic converter becomes the same as the engine cooling water temperature.

On the other hand, if either of the conditions of steps 1113 and 1115 is not satisfied, since it is considered that the engine is restarted before it completely cooled down and the temperature of the catalytic converter is largely affected by the ambient temperature, the routine proceeds to step 1119 which determines the initial temperature TCI of the catalytic converter, in accordance with the engine cooling water temperature $THW_0$ and the ambient temperature $THA_1$, from the map in FIG. 13.

At step 1121, the total amount of the heat $Q_0$ required for warming up the catalytic converter is calculated in the same manner as in the embodiment of FIG. 9 using the initial temperature TCI estimated at step 1117 or 1119. Then, after setting the value of the flag F to be 1 at step 1123, the routine terminates.

According to the present embodiment, the initial temperature TCI is estimated based on the ambient temperature as well as the engine cooling water temperature, and the total amount of the heat $Q_0$ required for warming up the catalytic converter is calculated in accordance with this initial temperature. Therefore, the completion of the warming up of the catalytic converter is accurately determined without being affected by the variation of the ambient temperature.

We claim:

1. A warming up control device for controlling a warming up operation of a catalytic converter disposed in an exhaust gas passage of an internal combustion engine comprising:

a heat amount estimating means for calculating an amount of heat transferred to the catalytic converter from an exhaust gas, said heat amount estimating means estimates said amount of heat based on an amount of the fuel fed to the engine and an ignition timing of the engine;

an total heat amount calculating means for calculating an accumulated value of the heat amount estimated by said heat amount estimating means after the engine starts; and, a determining means for determining that the catalytic converter has been warmed up when said total value of the heat amount reaches a predetermined set value.

2. A device according to claim 1, further comprising a correcting means for correcting the heat amount estimated by said heat amount estimating means based on an engine speed, and said total heat amount calculating means calculates the total value of the heat amount corrected by said correcting means.

3. A device according to claim 2, wherein said correcting means corrects said heat amount estimated by said heat amount estimating means in such a manner that said heat amount is increased as the engine speed increases.

4. A device according to claim 1, further comprising a correcting means for correcting the value of the heat amount estimated by said heat amount estimating means based on an air-fuel ratio on which the engine operates, and said total heat amount calculating means calculates the total value of the heat amount corrected by said correcting means.

5. A device according to claim 4, wherein said correcting means corrects the value of said heat amount estimated by said heat amount estimating means in such a manner that said heat amount is increased as the air-fuel ratio of the engine increases.

6. A device according to claim 1, further comprising an initial temperature estimating means for estimating the temperature of said catalytic converter when the engine starts, and a setting means for determining said set value on which said determining means determines that the catalytic converter has been warmed up based on said initial temperature of the catalytic converter estimated by said initial temperature estimating means.

7. A device according to claim 6, wherein said initial temperature estimating means estimates the temperature of the catalytic converter when the engine starts based on a temperature of an engine cooling water when the engine starts.

8. A device according to claim 7, wherein said initial temperature estimating means estimates the temperature of the catalytic converter when the engine starts based on said temperature of the engine cooling water when the engine starts and a temperature of an inlet air of the engine after the engine starts.

* * * * *